US011221742B2

(12) United States Patent
Reichard et al.

(10) Patent No.: US 11,221,742 B2
(45) Date of Patent: Jan. 11, 2022

(54) MOBILE SCALABLE COMPUTE MODULE

(71) Applicant: Rockwell Automation Technologies, Inc., Mayfield Heights, OH (US)

(72) Inventors: Douglas J. Reichard, Mayfield Heights, OH (US); Sharath Chander Reddy Baddam, Mayfield Heights, OH (US); Deepa S. Bekal, Solon, OH (US); Nicholas J. Marangoni, Peninsula, OH (US); Ike C. Mao, Willoughby Hills, OH (US); Dan W. Guendelsberger, Bloomfield Hills, MI (US); Brian J. Gelly, Cincinnati, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 0 days.

(21) Appl. No.: 16/189,770

(22) Filed: Nov. 13, 2018

(65) Prior Publication Data

US 2019/0171342 A1 Jun. 6, 2019

Related U.S. Application Data

(60) Provisional application No. 62/585,033, filed on Nov. 13, 2017.

(51) Int. Cl.
*G06F 3/048* (2013.01)
*G06F 3/0484* (2013.01)
*H04L 29/08* (2006.01)
*G06F 9/451* (2018.01)

(52) U.S. Cl.
CPC ........... *G06F 3/0484* (2013.01); *H04L 67/12* (2013.01); *H04L 67/125* (2013.01); *H04L 67/141* (2013.01); *H04L 67/26* (2013.01); *H04L 67/34* (2013.01); *H04L 67/36* (2013.01); *G06F 9/452* (2018.02)

(58) Field of Classification Search
None
See application file for complete search history.

(56) References Cited

U.S. PATENT DOCUMENTS

| 7,539,724 | B1* | 5/2009 | Callaghan | G05B 19/4185 709/205 |
| 2010/0115390 | A1* | 5/2010 | Desantis | G06F 16/9577 715/212 |
| 2011/0126142 | A1* | 5/2011 | Zhou | G05B 19/4183 715/771 |
| 2013/0212214 | A1* | 8/2013 | Lawson | H04L 43/045 709/217 |
| 2016/0034809 | A1* | 2/2016 | Trenholm | G06F 9/5027 706/20 |

* cited by examiner

*Primary Examiner* — William C Trapanese

(57) ABSTRACT

Techniques to facilitate interactions with industrial devices in an industrial automation environment are disclosed herein. In at least one implementation, a realtime communication connection is established through a common gateway platform to an industrial controller. A realtime notification message is received comprising industrial data and display instructions encoded into a text string generated by the industrial controller, the display instructions comprising display properties for the industrial data that specify how to display the industrial data on a computing device. The text string is processed to generate and render a display of the industrial data for display on the computing device according to the display properties provided in the display instructions.

20 Claims, 15 Drawing Sheets

MOBILE SCALABLE COMPUTE MODULE

RELATED APPLICATIONS

This application claims the benefit of, and priority to, U.S. Provisional Patent Application No. 62/585,033, entitled "MOBILE SCALABLE COMPUTE MODULE" filed Nov. 13, 2017, which is hereby incorporated by reference in its entirety for all purposes.

TECHNICAL FIELD

Aspects of the disclosure are related to computing hardware and software technology.

TECHNICAL BACKGROUND

Software applications that run on computing systems commonly provide some type of user client interface to present information to the user and receive user inputs. In a typical client-server architecture, an application running on a client computing system receives data transmitted from a server over a communication network for display to the user on the user client interface.

Industrial automation environments utilize machines and other devices during the industrial manufacturing process. These machines typically have various moving parts and other components that continually produce operational data over time, such as pressure, temperature, speed, and other metrics. Reviewing and monitoring this operational data is of high importance to those involved in operating an industrial enterprise.

In some cases, the operational data may be provided for display on a variety of systems and devices, such as notebook or tablet computers running standalone applications, web browsers, and the like, in order to present the information to the user. For example, a tablet computer could receive a constant stream of the operational data over a network and display this information dynamically, such as by providing live tiles, icons, charts, trends, and other graphical representations which continually receive updated operational data from external data sources, which are typically located in the industrial automation environment.

Overview

Disclosed herein are techniques to facilitate interactions with industrial devices in an industrial automation environment. In at least one implementation, a realtime communication connection is established through a common gateway platform to an industrial controller. A realtime notification message is received comprising industrial data and display instructions encoded into a text string generated by the industrial controller, the display instructions comprising display properties for the industrial data that specify how to display the industrial data on a computing device. The text string is processed to generate and render a display of the industrial data for display on the computing device according to the display properties provided in the display instructions.

This Overview is provided to introduce a selection of concepts in a simplified form that are further described below in the Detailed Description. It should be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Figure 1:
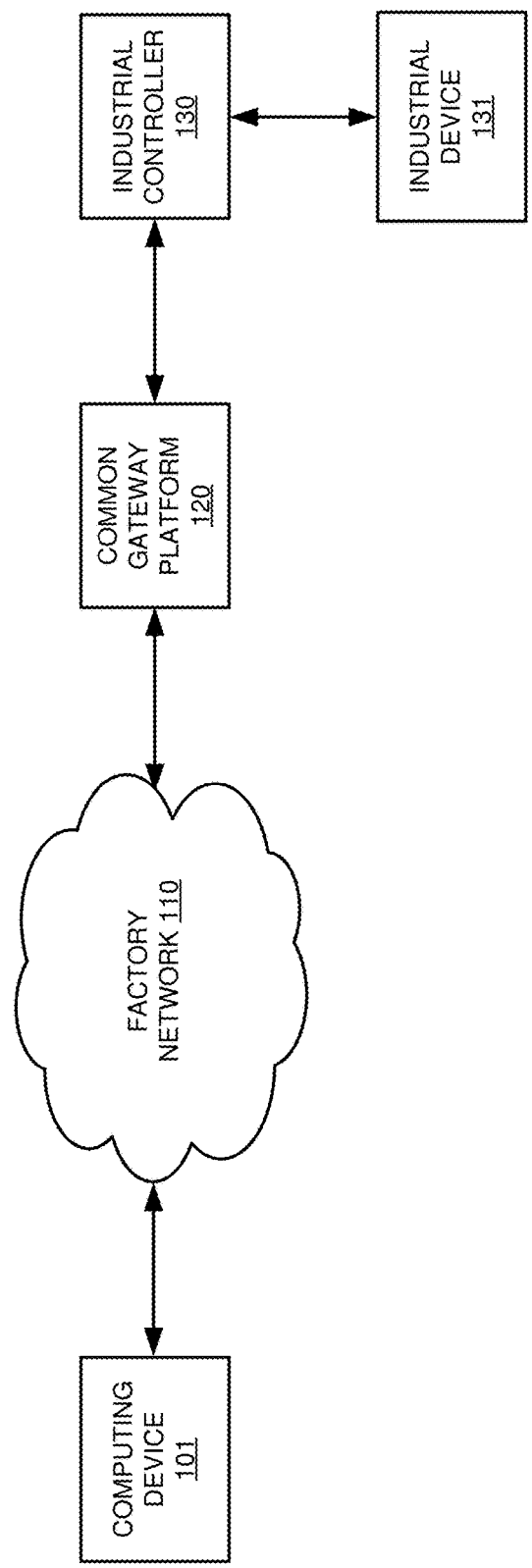
FIG. 1 is a block diagram that illustrates a communication system in an exemplary implementation.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

In traditional mobile applications for industrial operations, there is often no mechanism to write back control system data directly from the mobile application to an industrial controller that controls an industrial device. Instead, control program editors such as logic designers or human-machine interface (HMI) devices may be utilized to write control data back to a controller. In addition, although industrial mobile applications are frequently treated as endpoints to a common gateway platform, such applications do not have the ability to function as both a data-consuming application and a data-producing adapter. Further, data analytics and other complex functionality may commonly be performed on an external gateway or system, and not by the mobile application itself.

Implementations disclosed herein provide techniques to facilitate interactions with industrial devices in an industrial automation environment. Some examples of industrial devices that a mobile computing device may be configured to interact with using the techniques disclosed herein include industrial control systems such as industrial controllers and programmable logic controllers (PLCs), motion control products such as servo drives, servo motors, and actuators, encoders that electronically monitor positions of rotating components, and any other machine, component, or device that may be utilized in industrial operations. To achieve this interaction between a computing device and an industrial device, at least one implementation includes establishing a real-time communication connection to an industrial controller via a common gateway platform. In some examples, the common gateway platform may be installed and executing on a stand-alone computing system, the industrial controller itself, or any other computing system or device, including combinations thereof. In some implementations, the common gateway platform may be embedded into a mobile application to function as both a data-consuming application and a data-producing adapter for the common gateway platform. Moreover, a mobile application may provide functionality to enable remote configuration of gateway components and their behavior from within the mobile application. Once configured by the mobile application, the gateway may operate to enable the mobile application to write back control system data to an industrial controller and/or device. Further, in at least one implementation, the gateway may be configured by the mobile application to interact with a wearable device to enable the wearable device to not only read and display device data from an industrial device but also to acknowledge or write back control system data to an industrial controller and/or device.

Figure 2:
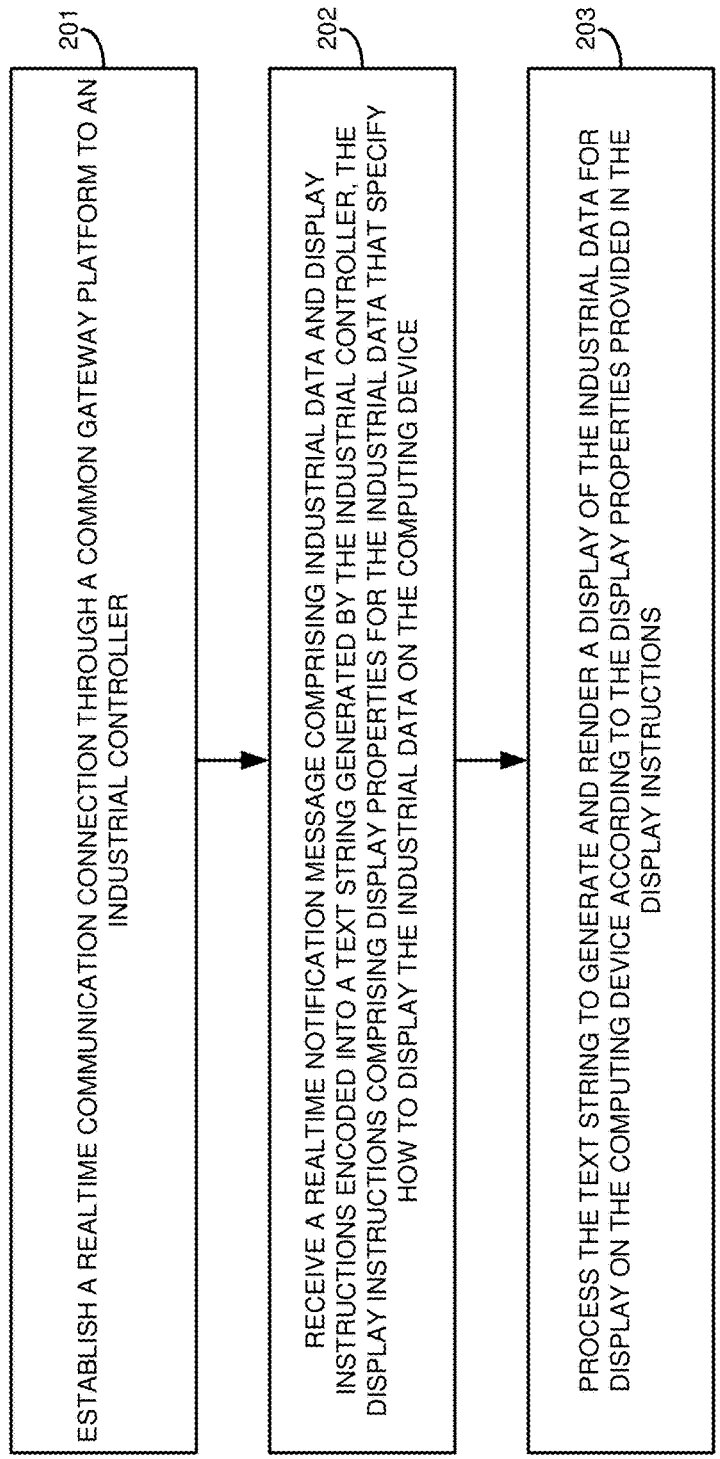
FIG. 2 is a block diagram that illustrates a process flow in an exemplary embodiment.
Figure 3:
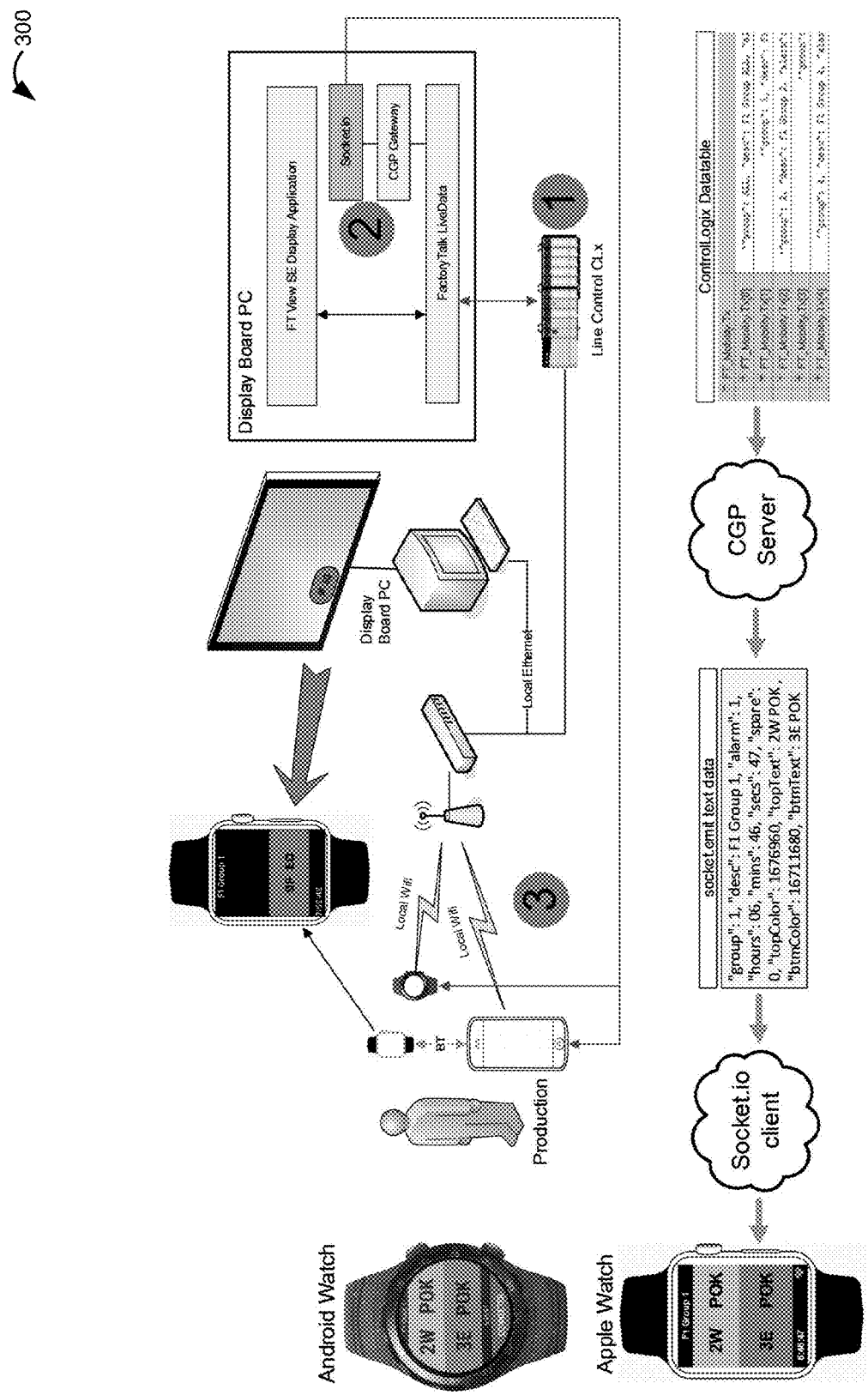
FIG. 3 is a block diagram that illustrates an operation of a communication system in an exemplary implementation.
Figure 4:
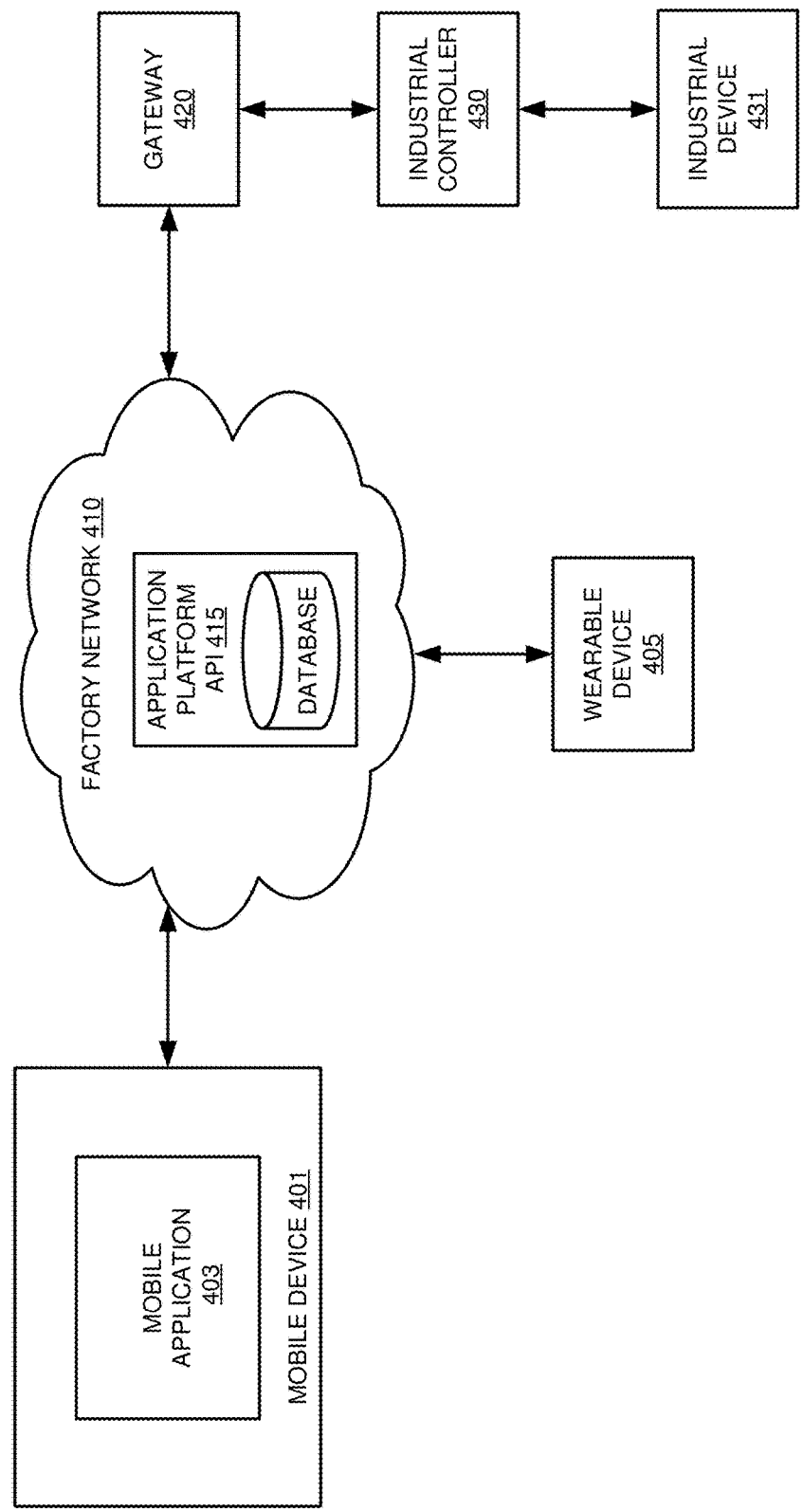
FIG. 4 is a block diagram that illustrates a communication system in an exemplary implementation.
Figure 5:
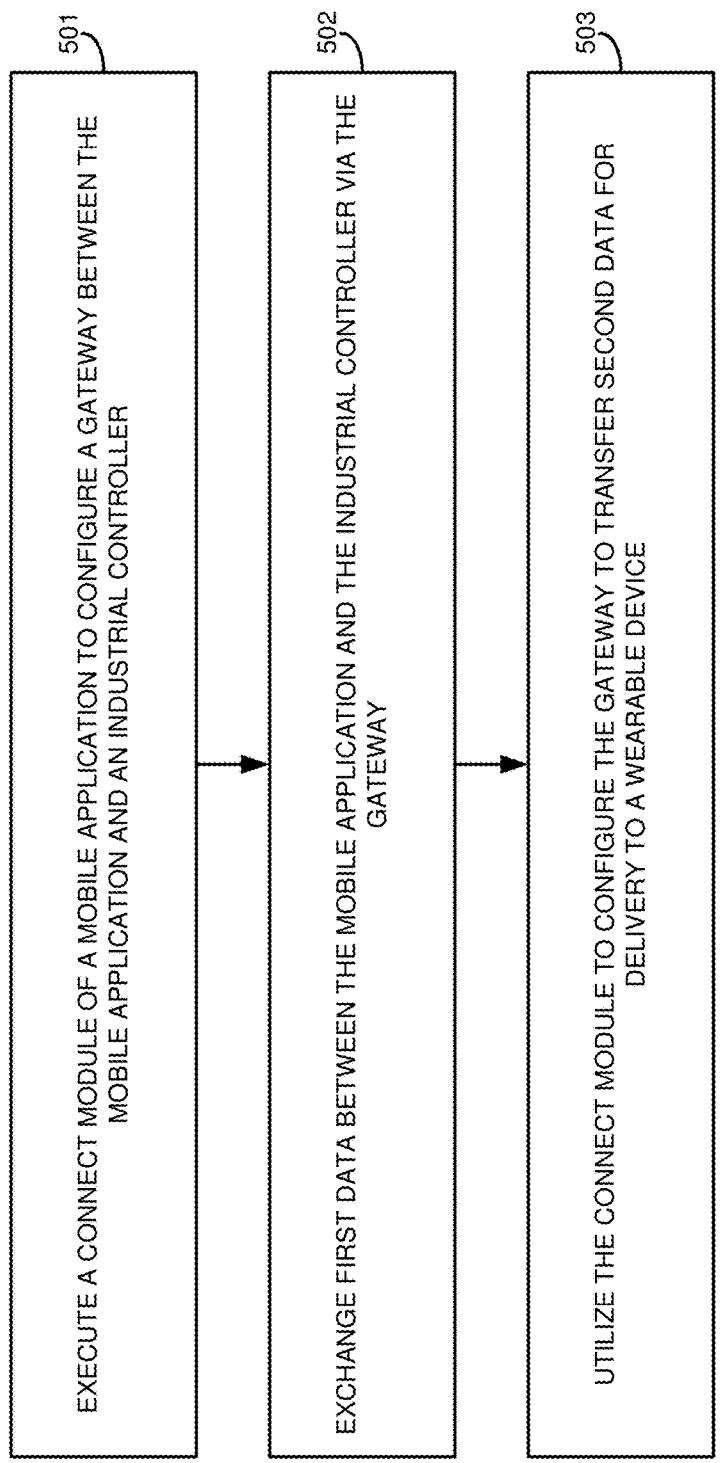
FIG. 5 is a block diagram that illustrates a process flow in an exemplary embodiment.
Figure 6:
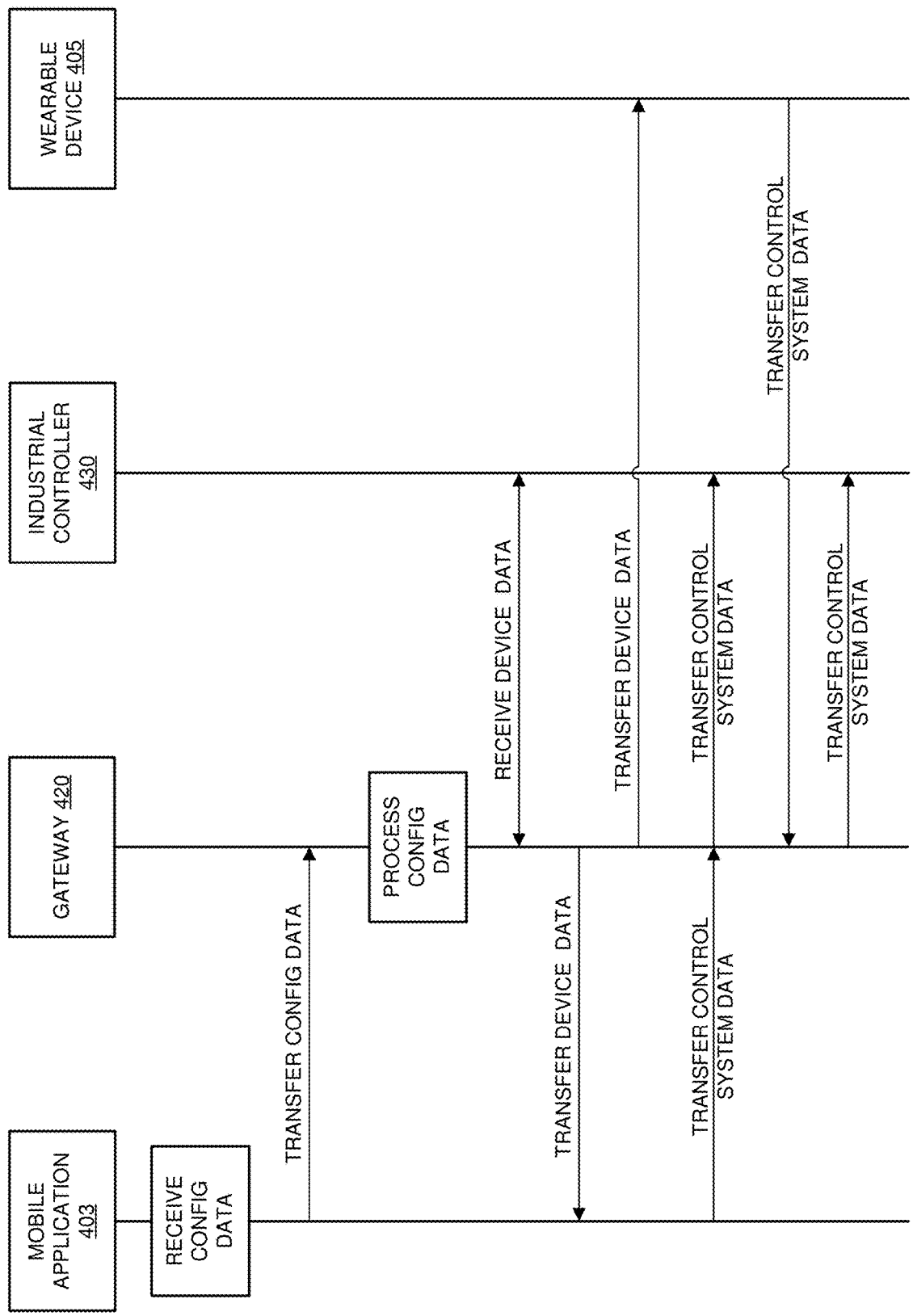
FIG. 6 is a sequence diagram that illustrates an operation of a communication system in an exemplary embodiment.
Figure 11:
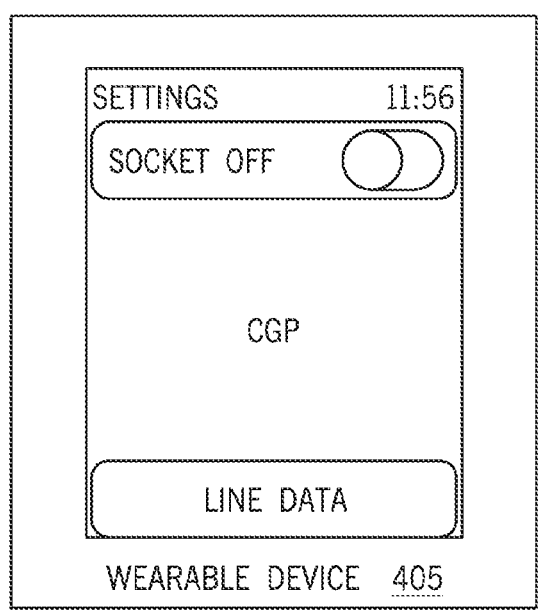
FIG. 11 is a block diagram that illustrates an operational scenario of an application displayed on a wearable device in an exemplary implementation.
Figure 12:
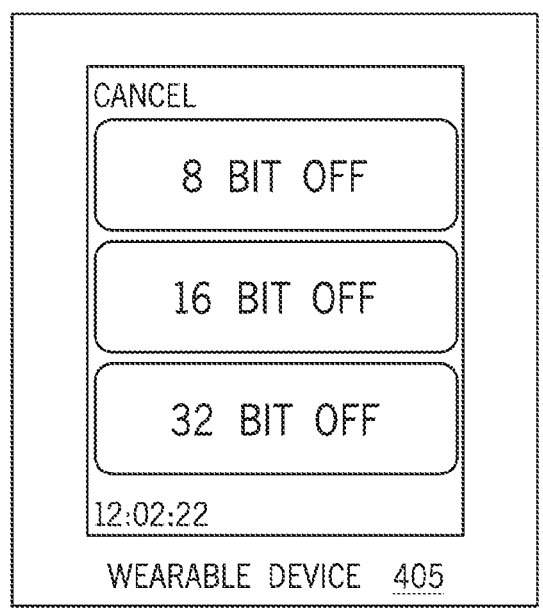
FIG. 12 is a block diagram that illustrates an operational scenario of an application displayed on a wearable device in an exemplary implementation.
Figure 13:
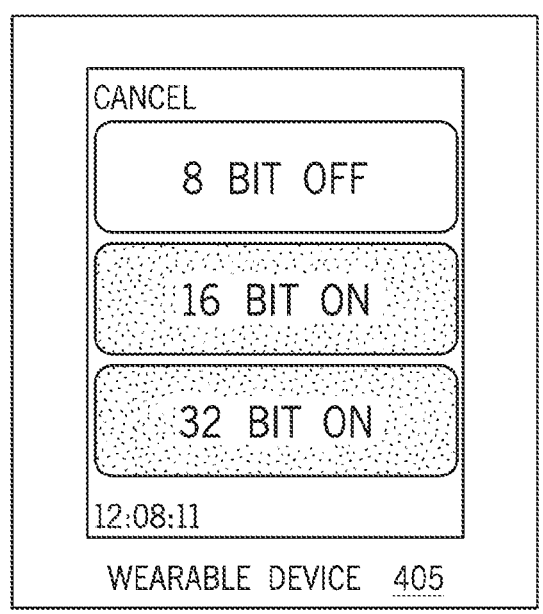
FIG. 13 is a block diagram that illustrates an operational scenario of an application displayed on a wearable device in an exemplary implementation.
Figure 14:
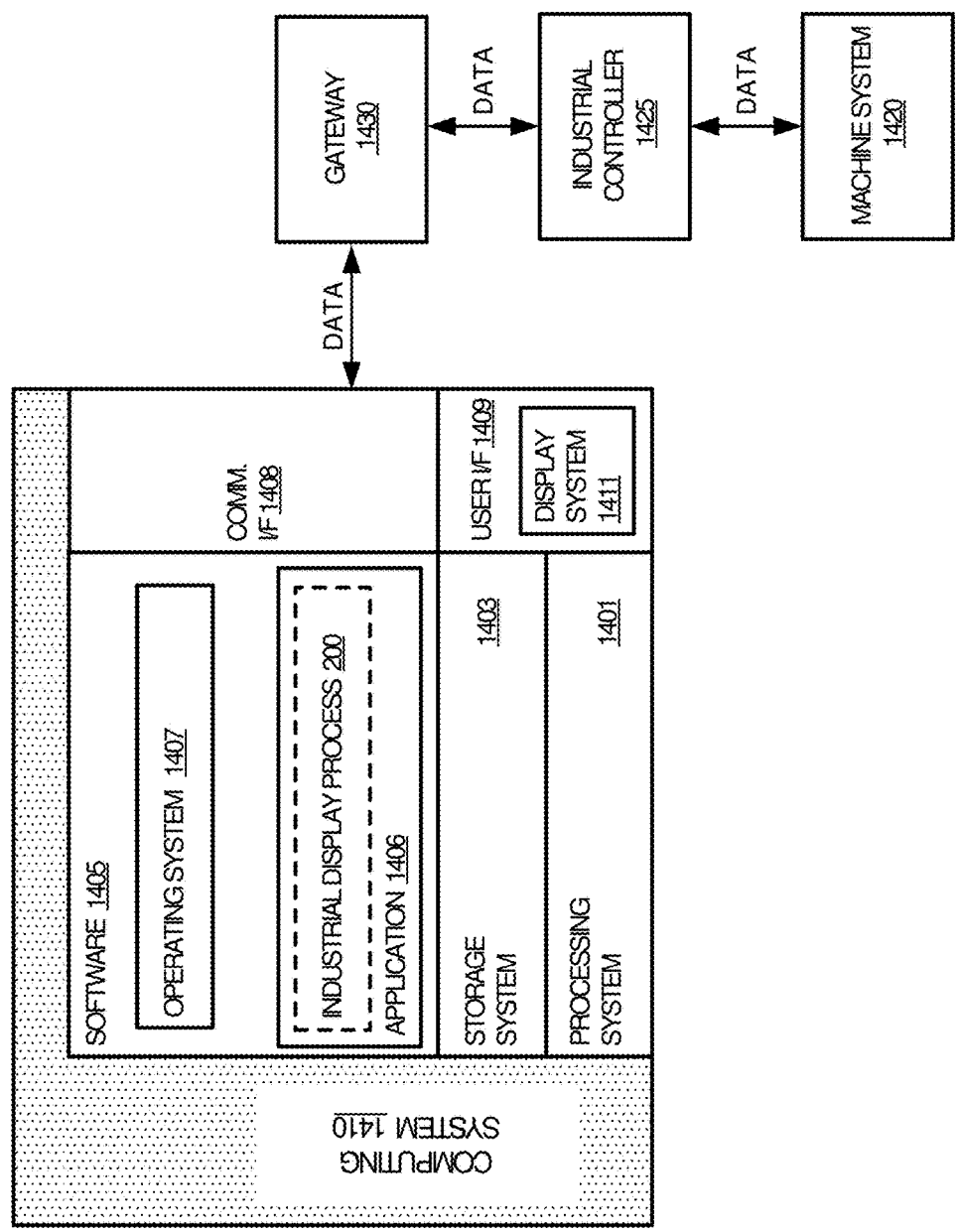
FIG. 14 is a block diagram that illustrates an operational scenario involving a computing system in an industrial automation environment in an exemplary implementation.
Figure 15:
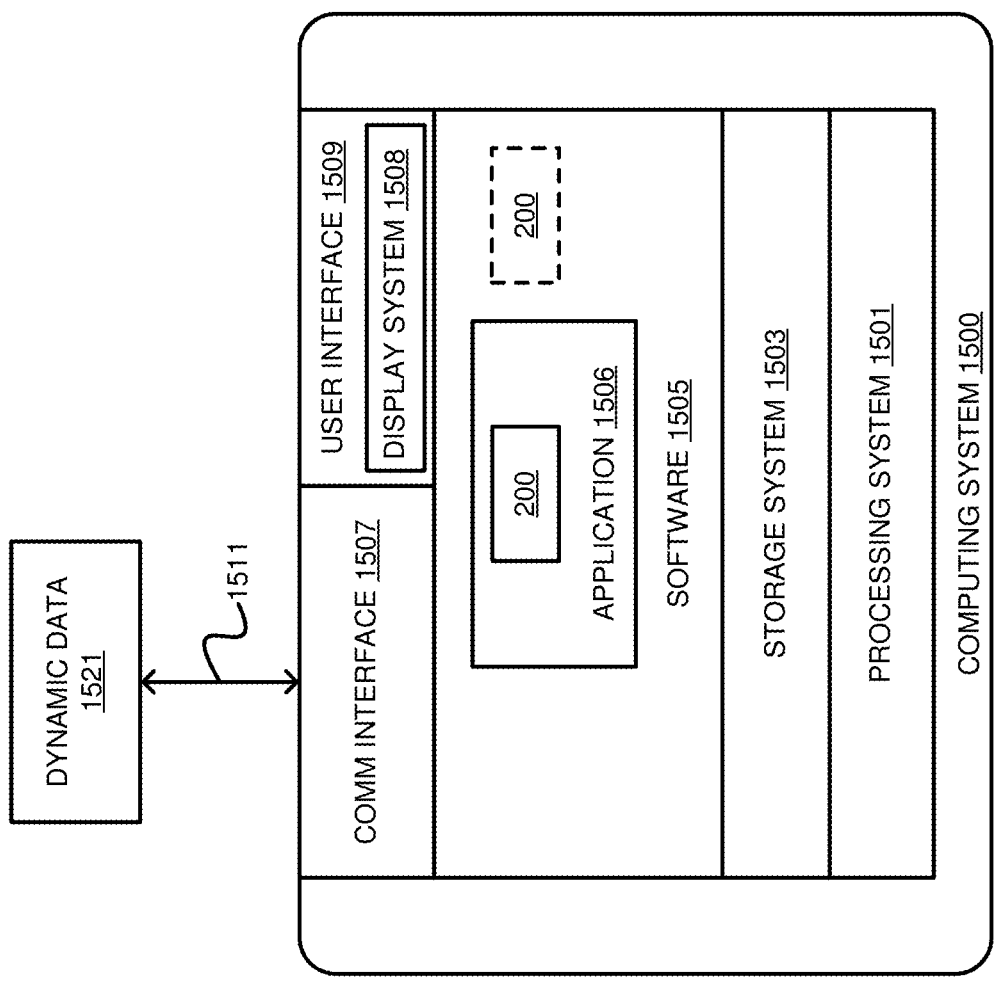
FIG. 15 is a block diagram that illustrates a computing system in an exemplary implementation.

Referring now to the drawings, FIG. 1 illustrates a communication system of an industrial automation environment in an exemplary implementation. FIG. 2 illustrates a process flow in an exemplary embodiment, while FIG. 3 is a block diagram that illustrates an operation of a communication system in an exemplary embodiment. FIG. 4 illustrates a communication system of an industrial automation environment in an exemplary implementation. FIG. 5 illustrates a process flow in an exemplary embodiment, while FIG. 6 is a sequence diagram that illustrates an operation of a communication system in an exemplary embodiment. FIGS. 7-10 illustrate various exemplary graphical user interfaces of a mobile application executing on a mobile device to configure a gateway server for the mobile application and a separate wearable device. FIGS. 11-13 illustrate various exemplary graphical user interfaces of a wearable device interacting with an industrial device via a gateway server. FIG. 14 illustrates an exemplary industrial automation environment that includes a computing system that may be used to execute a gateway configuration process, and FIG. 15 illustrates an exemplary computing system that may be used to perform any of the gateway configuration processes and operational scenarios described herein.

Turning now to FIG. 1, a communication system 100 of an industrial automation environment is illustrated. Communication system 100 provides an example of a communication system that may be used to implement an industrial display process to facilitate interactions with industrial devices in an industrial automation environment as described herein. Communication system 100 includes computing device 101, factory network 110, common gateway platform 120, industrial controller 130, and industrial device 131. Computing device 101 could comprise any type of mobile communication device, such as a smartphone, tablet, or laptop, a wearable device such as a smartwatch, or any other type of computing device, including combinations thereof. In at least one implementation, computing device 101 may include a mobile application installed thereon. In some examples, the mobile application could comprise an automation mobile application for use on a mobile device such as a smartphone, tablet, laptop, or the like. In some examples, the mobile application could comprise a FactoryTalk® TeamONE mobile application provided by Rockwell Automation, Inc. In this example, factory network 110 comprises a communication network of an industrial automation environment. Note that factory network 110 could comprise an on-premise manufacturing network, such as a local communication network on the plant floor, a cloud-based communication network, or some other network or service, including combinations thereof. Further, although the common gateway platform 120 is shown external to industrial controller 130 in this example, in some implementations the common gateway platform 120 or at least portions thereof can be installed on industrial controller 130, thereby enabling industrial controller 130 to serve as gateway 120 by utilizing the computational and networking resources of industrial controller 130 to provide some or all of the functionality attributed to the common gateway platform 120.

In operation, computing device 101 may be configured to communicate with factory devices, such as industrial controller 130 and/or industrial device 131, which could comprise machines, drives, motors, or some other industrial automation equipment. In this example, computing device 101 may communicate with industrial controller 130 and/or industrial device 131 via common gateway platform 120, where gateway 120 serves as a mediator between computing device 101 and industrial controller 130 and/or device 131. In this example, computing device 101 is configured to transmit control commands and retrieve industrial data from industrial device 131 via industrial controller 130 and common gateway platform 120. The control commands and/or device data can be transmitted to and from computing device 101 using any communication protocol, such as common industrial protocol (CIP), digital signal interface (DSI), DPI, digital addressable lighting interface (DALI), open platform communications (OPC) unified architecture (UA), hypertext transfer protocol (HTTP), representational state transfer (REST), socket.IO, and any other device communication protocol, including combinations thereof. In some examples, the industrial data retrieved from industrial device 131 via controller 130 and gateway platform 120 could comprise a raw data list, visualizations including a multi-pen trend, and any other data associated with industrial device 131 and/or industrial controller 130. Visualizations for the device data could also be generated by computing device 101, such as trends, charts, graphs, gauges, meters, data tables, and other graphical data visualizations. Further, computing device 101 may also run data analytics on the retrieved device data using the computational resources of computing device 101. The retrieved device data and any visualizations and/or analytics generated by computing device 101 may also be stored within a memory system of computing device 101, and may be transmitted to a database within factory network 110 or some other remote data storage system in some examples.

In some examples, a mobile application executing on computing device 101 may provide a mechanism to configure the common gateway platform 120 between computing device 101 and industrial controller 130. Once configured, common gateway platform 120 could be utilized by computing device 101 to receive industrial data and display instructions from industrial controller 130 and/or device 131, receive notifications from device 131 and/or controller 130 such as alerts and alarms, and to write control system data back to industrial controller 130 via gateway 120, among other functionality. The user viewing the device data, visualizations, analytics, and other information on computing device 101 may interact with the data and operate application features to turn pens on or off, use tooltips for data points, zoom, pan, scroll, perform data analytics functions, and execute any other functions to interact with the data. Exemplary operations of communication system 100 to facilitate interactions with industrial devices in an industrial automation environment will now be discussed with respect to FIGS. 2 and 3.

FIG. 2 is a flow diagram that illustrates an operation of computing device 101 in an exemplary implementation. The operation 200 shown in FIG. 2 may also be referred to as industrial display process 200 herein. The steps of the operation are indicated below parenthetically. The following discussion of operation 200 will proceed with reference to elements of communication system 100 of FIG. 1 in order to illustrate its operations, but note that the details provided in FIG. 1 are merely exemplary and not intended to limit the scope of process 200 to the specific implementation of FIG. 1.

Operation 200 may be employed by computing device 101 to facilitate interactions with industrial devices in an industrial automation environment. As shown in the operational flow of FIG. 2, computing device 101 establishes a realtime communication connection through common gateway platform 120 to industrial controller 130 (201). In some examples, common gateway platform 120 may be configured to operate as a gateway to enable realtime interactions between computing device 101 and industrial controller 130 and/or industrial device 131. In some implementations, computing device 101 may establish the realtime communication connection through common gateway platform 120 by configuring the common gateway platform 120 according to user input received by computing device 101 that indicates a gateway server address associated with common gateway platform 120. In at least one implementation, the realtime communication connection through the common gateway platform to the industrial controller could comprise a socket.IO connection. In this case, common gateway platform 120 may poll and publish industrial data from industrial controller 130 on socket.IO to facilitate realtime delivery to a subscribing mobile application of computing device 101.

Computing device 101 receives a realtime notification message comprising industrial data and display instructions encoded into a text string generated by industrial controller 130, the display instructions comprising display properties for the industrial data that specify how to display the industrial data on computing device 101 (202). The industrial data received by computing device 101 could comprise device status information associated with industrial device 131 operated by industrial controller 130, notifications from industrial device 131 and/or controller 130 such as alerts and alarms, data visualizations, analytics, or any other data associated with industrial controller 130 and industrial device 131 and their operations. In some implementations, computing device 101 may be configured to write control system data back to industrial controller 130 via common gateway platform 120, where the control system data is executable by controller 130 to direct an operation of industrial device 131. For example, in at least one implementation, a mobile application installed on computing device 101 may be used to configure common gateway platform 120 to exchange data between the mobile application and industrial controller 130 by enabling computing device 101 to receive the industrial data from industrial controller 130 and/or industrial device 131 via common gateway platform 120, to write control system data back to controller 130 and/or device 131 via gateway 120, or to facilitate any other data exchange between computing device 101 and industrial controller 130 and/or industrial device 131. The display instructions comprising the display properties for the industrial data may be generated by industrial controller 130 by compiling application-specific display information for computing device 101. In at least one implementation, the realtime notification message received by computing device 101 is generated and transmitted by industrial controller 130 via common gateway platform 120. For example, in the case of a socket.IO connection, industrial controller 130 may generate the realtime notification message by encoding the industrial data and the display instructions into the text string, and then provide the string to the common gateway platform 120 which in turn immediately publishes the text string to socket.IO in order to provide the realtime notification message to computing device 101 in realtime. In some implementations, the industrial data and display instructions are encoded into the text string by industrial controller 130 using comma-separated values or some other delimiter to encode the data values into the string. Other techniques of encoding the data into the text string are possible and within the scope of this disclosure.

Computing device 101 processes the text string to generate and render a display of the industrial data for display on computing device 101 according to the display properties provided in the display instructions (203). In at least one implementation, computing device 101 may be configured to process the text string by parsing text string to extract the data values of the industrial data and the display instructions from the string. Once the data has been extracted, computing device 101 may process the display instructions to generate and render the display of the industrial data for display on computing device 101 according to the display properties provided in the display instructions. In this manner, the application-specific display information provided by industrial controller 130 in the display instructions may be used by computing device 101 to render a display of the industrial data for display on computing device 101 in realtime.

Advantageously, computing device 101 establishes a realtime communication connection through a common gateway platform 120 to industrial controller 130, enabling computing device 101 to receive industrial data and status updates from industrial controller 130 in realtime. Further, computing device 101 may receive display instructions encoded into a text string by industrial controller 130 that describe application-specific display information for computing device 101. In this manner, computing device 101 is able to render a display of the industrial data for display on computing device 101 in realtime according to the display properties provided in the display instructions. A technical advantage is achieved by providing the industrial data directly to the user of computing device 101 in realtime, saving significant time over any other notification system. Another exemplary operation of communication system 100 to facilitate interactions with industrial devices using mobile computing devices will now be discussed with respect to FIG. 3.

FIG. 3 is a system diagram that illustrates an operation of communication system 300 in an exemplary embodiment. Communication system 300 provides an example of communication system 100, although system 100 could use alternative configurations. The following operations could be executed by computing device 101 and other elements of communication system 100, and could also be combined with operation 200 of FIG. 2 in some implementations.

As shown in FIG. 3, the steps of the operation are labeled one through three in this example. Communication system 300 includes a display board personal computer (PC), line control CLx, a smartphone, and a smartwatch. In this example, the display board PC functions as a common gateway platform (CGP) server. Accordingly, the display board PC provides an example of common gateway platform 120, although gateway platform 120 may use alternative configurations. Similarly, line control CLx provides an example of industrial controller 130, although controller 130 could use alternative configurations. Note that although the CGP gateway is shown as provided separately by the display board PC in this example, the functionality attributed to the CGP could be included in the line control CLx controller in some examples.

In operation, the line control CLx compiles all phone/watch application-specific information (step one). The CGP gateway server constantly polls and publishes the application-specific information on socket.IO (step two). The client devices are notified of updates, and the display screens are rendered in realtime (step three). As shown in FIG. 3, the wearable devices may either receive, process, and render the display screens directly from the CGP server over socket.IO, or may receive this data indirectly via a smartphone serving as a mediator between the smartwatch and the CGP gateway.

Referring still to FIG. 3, the ControlLogix Datatable shown in the bottom right corner provides an example of data generated by the line control CLx for a client computing device. In this example, the CGP server takes the data from this table and generates a notification message for the client device in a colon-delimited list of values as shown in the socket.emit text data table on FIG. 3. In this example, the text data indicates the group description of "F1 Group 1", an alarm value of 6 hours, 46 minutes, and 47 seconds, and top text of "2W POK" with a display color of "1676960", and bottom text of "3E POK" with a display color or "16711680". This text string is placed on the socket.IO by the CGP server and received in realtime by the smartwatch. The smartwatch then parses this industrial data and display instructions to render the display of the data with the coloring and arrangement as shown in FIG. 3. By providing the data to the client mobile device in realtime, critical status information is delivered faster than conventional notification mechanisms, thereby allowing for improved response time and reduced downtime.

Turning now to FIG. 4, a communication system 400 of an industrial automation environment is illustrated. Communication system 400 provides an example of a communication system that may be used to implement a gateway configuration process to facilitate interactions with industrial devices using a mobile application associated with an industrial automation environment as described herein. Communication system 300 also provides an example of communication system 100, although system 100 could use alternative configurations. The following operations could be executed by computing device 101 and other elements of communication system 100, and could also be combined with operation 200 of FIG. 2 in some implementations.

Communication system 400 includes mobile device 401, wearable device 405, factory network 410, gateway 420, industrial controller 430, and industrial device 431. Mobile device 401 includes mobile application 403 installed thereon. Mobile application 403 comprises an automation mobile application for use on a mobile device such as a smartphone, tablet, laptop, or the like. In some examples, mobile application 403 could comprise a FactoryTalk® TeamONE mobile application provided by Rockwell Automation, Inc. In this example, factory network 410 includes application platform application programming interface (API) server 415. Application platform API server 415 includes databases that store data that may be shared by a team of users of mobile application 403, among other data. Application platform API server 415 may be omitted in some examples. Note that factory network 410 could comprise an on-premise manufacturing network, such as a local communication network on the plant floor, a cloud-based communication network, or some other network or service, including combinations thereof. Further, although gateway 420 is shown external to mobile device 401 and mobile application 403 in this example, in some implementations mobile application 403 can serve as gateway 420 by utilizing the computational and networking resources of mobile device 401, thereby providing some or all of the functionality attributed to gateway 420.

In operation, mobile application 403 executes on mobile device 401 to perform various functions, which could include sending API calls over a hypertext transfer protocol secure (HTTPS) connection to application platform API server 415 for storing or retrieving data in the database. Mobile application 403 may also direct mobile device 401 to communicate with factory devices, such as industrial controller 430 and/or industrial device 431, which could comprise machines, drives, motors, or some other industrial automation equipment. In this example, mobile application 403 directs mobile device 401 to communicate with industrial controller 430 and/or industrial device 431 via gateway 420, where gateway 420 serves as a mediator between mobile application 403 and industrial controller 430 and/or device 431. However, mobile application 403 could direct mobile device 401 to communicate directly with industrial controller 430 and/or device 431 in some examples where gateway 420 is implemented in software within mobile application 403.

In this example, mobile application 403 directs mobile device 401 to transmit control commands and retrieve device data from industrial device 431 via industrial controller 430 and gateway 420. The control commands and/or device data can be transmitted to and from mobile application 403 using any communication protocol, such as CIP, DSI, DPI, DALI, OPC UA, HTTP, REST, socket.IO, and any other device communication protocol, including combinations thereof. In some examples, the device data retrieved from industrial device 431 via controller 430 and gateway 420 could comprise a raw data list, visualizations including a multi-pen trend, and any other data associated with industrial device 431 and/or industrial controller 430. Visualizations for the device data could also be generated by mobile application 403 on mobile device 401, such as trends, charts, graphs, gauges, meters, data tables, and other graphical data visualizations. Further, mobile application 403 may also run data analytics on the retrieved device data using the computational resources of mobile device 401. The retrieved device data and any visualizations and/or analytics generated by mobile application 403 may also be stored within a memory system of mobile device 401, and may be transmitted to the database of the factory platform API 415 or some other remote data storage system in some examples.

In some examples, mobile application 403 may be configured to provide the retrieved device data and any visualizations and/or analytics generated by mobile application 403 for delivery to and display on wearable device 405. In addition, mobile application 403 also provides a mechanism to configure gateway 420 between mobile application 403 and industrial controller 430, and to configure gateway 420 for wearable device 405 and industrial controller 430. Once configured, gateway 420 could be utilized by wearable device 405 to receive device data from industrial controller 430 and/or device 431, receive notifications from device 431 and/or controller 430 such as alerts and alarms, and to write control system data back to industrial controller 430 via gateway 420, among other functionality. The user viewing the device data, visualizations, analytics, and other information on wearable device 405 may also interact with the data in the same manner as the user operating mobile application 403 on mobile device 401. For example, the user viewing the data on wearable device 405 may operate application features to turn pens on or off, use tooltips for data points, zoom, pan, scroll, perform data analytics functions, and execute any other functions when interacting with the data.

Beneficially, a common gateway platform may be embedded into mobile application 403 to enable operability as both a data-consuming application and a data-producing adapter. In addition, mobile application 403 may provide the ability to enable remote configuration of gateway 420 components from within mobile application 403. Once configured by mobile application 403, gateway 420 may operate to enable mobile application 403 to write back control system data to industrial controller 430 and/or device 431. Further, in at least one implementation, gateway 420 may be configured by mobile application 403 to interact with wearable device 405. In this manner, wearable device 405 is enabled to receive device data from industrial controller 430 and/or industrial device 431 via gateway 420, and also write back control system data to controller 430 and/or industrial device 431. Exemplary operations of communication system 400 to facilitate interactions with industrial devices using mobile application 403 associated with an industrial automation environment will now be discussed with respect to FIGS. 5 and 6.

FIG. 5 is a flow diagram that illustrates an operation of mobile device 401 in an exemplary implementation. The operation 500 shown in FIG. 5 may also be referred to as gateway configuration process 500 herein. The steps of the operation are indicated below parenthetically. The following discussion of operation 500 will proceed with reference to elements of communication system 400 of FIG. 4 in order to illustrate its operations, but note that the details provided in FIG. 4 are merely exemplary and not intended to limit the scope of process 500 to the specific implementation of FIG. 4.

Operation 500 may be employed by mobile device 401 to facilitate interactions with industrial devices using mobile application 403 associated with an industrial automation environment. Note that the following operations could be executed by computing device 101 and other elements of communication system 100, and could also be combined with operation 200 of FIG. 2 in some implementations.

As shown in the operational flow of FIG. 5, mobile device 401 executes a connect module of mobile application 403 to configure gateway 420 between mobile application 403 and industrial controller 430 (501). In some examples, mobile application 403 configures gateway 420 to operate as a gateway to enable interactions between mobile application 403 and industrial controller 430 and/or industrial device 431. In some implementations, mobile device 401 executing the connect module of mobile application 403 to configure gateway 420 between mobile application 403 and industrial controller 430 may comprise receiving user input in the connect module of mobile application 403 that indicates a gateway server associated with gateway 420. However, in at least one implementation, gateway 420 may be embedded as a common gateway platform within mobile application 403, such that mobile application 403 functions as both a data-consuming application and a data-producing adapter. In such cases, mobile device 401 may execute the connect module of mobile application 403 to configure mobile application 403 to function as a gateway 420 between mobile application 403 and industrial controller 430. Other techniques of configuring gateway 420 between mobile application 403 and gateway 420 are possible and within the scope of this disclosure.

Mobile device 401 exchanges first data between mobile application 403 and industrial controller 430 via gateway 420 (502). The first data exchanged between mobile application 403 and industrial controller 430 comprises device data associated with industrial device 431 and/or controller 430, control system data executable by controller 430 to direct an operation of industrial device 431, data visualizations, analytics, or any other data associated with industrial controller 430 and industrial device 431 and their operations. Once configured by mobile application 403, gateway 420 may operate to exchange the first data between mobile application 403 and industrial controller 430 by enabling mobile application 403 to receive device data from industrial controller 430 and/or device 431 via gateway 420, to write control system data back to controller 430 and/or device 431 via gateway 420, or to facilitate any other data exchange between mobile application 403 and industrial controller 430 and/or industrial device 431. Again, as discussed above, mobile application 403 could direct mobile device 401 to communicate directly with industrial controller 430 and/or device 431 in some examples where gateway 420 is implemented in software within mobile application 403.

Mobile device 401 utilizes the connect module of mobile application 403 to configure gateway 420 to transfer second data for delivery to wearable device 405 (503). In some implementations, mobile device 401 utilizes the connect module to configure gateway 420 to transfer second data to wearable device 405 by directing mobile application 403 to configure gateway 420 to operate as a gateway to enable interactions between wearable device 405 and industrial controller 430 and/or industrial device 431. For example, mobile device 401 may utilize the connect module to configure gateway 420 for wearable device 405 by receiving user input in the connect module of mobile application 403 that indicates a gateway server associated with gateway 420 for wearable device 405. However, in at least one implementation, gateway 420 may be embedded as a common gateway platform within mobile application 403, such that mobile application 403 functions as both a data-consuming application and a data-producing adapter. In such cases, mobile device 401 may execute the connect module of mobile application 403 to configure mobile application 403 to function as a gateway 420 between wearable device 405 and industrial controller 430. The second data exchanged between wearable device 405 and industrial controller 430 comprises device data associated with industrial device 431 and/or controller 430, control system data executable by controller 430 to direct an operation of industrial device 431, data visualizations, analytics, or any other data associated with industrial controller 430 and industrial device 431 and their operations. In at least one implementation, wearable device 405 may be configured to write control system data back to industrial controller 430 via gateway 420. For example, the connect module of mobile application 403 may be executed to configure gateway 420 between wearable device 405 and industrial controller 430, and the second data may then be exchanged between wearable device 405 and controller 430 via gateway 420, which could include writing control system data from wearable device 405 back to industrial controller 430 via gateway 420 in some implementations. Once gateway 420 is properly configured, wearable device 405 may also be utilized to set tag values for industrial controller 430 and/or industrial device 431, receive and acknowledge alarms and other notifications from controller 430 and/or device 431, and perform other interactions with controller 430 and/or device 431 via gateway 420.

In some implementations, mobile application 403 may also direct mobile device 401 to transfer the first data from mobile application 403 for delivery to wearable device 405. Accordingly, instead of or in addition to interacting with industrial controller 430 and/or device 431 via gateway 420, wearable device 405 may receive device data associated with industrial device 431 and/or controller 430, control system data, data visualizations, analytics, and any other data directly from mobile device 401 via mobile application 403. Further, in some implementations mobile application 403 may be operable to perform analytics on the first data exchanged between mobile application 403 and industrial controller 430 via gateway 420. Mobile application 403 may also function to autonomously collect and post data to a team board to enable viewing and interacting with the data by a team of users, or to push this data and/or associated notifications to wearable device 405 and other devices of team members in some examples.

Advantageously, mobile application 403 provides the ability to enable remote configuration of gateway 420 from within mobile application 403. Once configured by mobile application 403, gateway 420 may operate to enable mobile application 403 to receive device data from industrial controller 430 and/or industrial device 431, and to write back control system data to these devices. Further, gateway 420 may be configured by mobile application 403 to interact with wearable device 405. In this manner, wearable device 405 is enabled to receive device data from industrial controller 430 and/or industrial device 431 via gateway 420, and also write back control system data to controller 430 and/or device 431. Additionally, gateway 420 may be embedded into mobile application 403 as a common gateway platform to function as both a data-consuming application and a data-producing adapter, enabling the collection of telemetry data, analytics, user interactions, location information, and other data. Accordingly, a technical advantage may be achieved by leveraging the computational capabilities of mobile device 401 to provide some or all of the functionality of gateway 420 to aggregate, filter, analyze, and perform analytics and transformations on data received from industrial controller 430 and/or device 431. Another exemplary operation of communication system 400 to facilitate interactions with industrial devices via mobile application 403 will now be discussed with respect to FIG. 6.

FIG. 6 is a sequence diagram that illustrates an operation of communication system 400 in an exemplary implementation. Note that the following operations could also be executed by computing device 101 and other elements of communication system 100, and could also be combined with operation 200 of FIG. 2 in some implementations. Initially, a user executes mobile application 403 to receive configuration data for gateway 420. In this example, the user provides the configuration data as user input into a connect module of mobile application 403 that indicates a gateway server associated with gateway 420. The configuration data is associated with industrial controller 430 and also specifies mobile application 403 and wearable device 405, such that the configuration data configures gateway 420 between mobile application 403 and industrial controller 430, and configures gateway 420 between wearable device 405 and controller 430. Mobile application 403 transfers the configuration data for delivery to gateway 420.

Gateway 420 receives the configuration data associated with industrial controller 430 transmitted from mobile application 403. Upon receiving the configuration data, gateway 420 processes the configuration data to transfer first data from industrial controller 430 for delivery to mobile application 403 via gateway 420, and to transfer second data from industrial controller 430 for delivery to wearable device 405 via gateway 420. Specifically, gateway 420 processes the configuration data to configure gateway 420 between mobile application 403 and industrial controller 430 and to configure gateway 420 between wearable device 405 and controller 430. Once properly configured, gateway 420 functions as a mediator between mobile application 403 and industrial controller 430, and between wearable device 405 and controller 430. Accordingly, gateway 420 communicates with industrial controller 430 to receive device data from controller 430, and transfers the device data for delivery to mobile application 403 and wearable device 405.

After configuring gateway 420 to communicate with industrial controller 430 for mobile application 403 and wearable device 405, a user operating mobile application 403 on mobile device 401 writes back control system data to industrial controller 430 via gateway 420. Mobile application 403 transfers the control system data to gateway 420 which in turn transfers the control system data to industrial controller 430 in order to write the control system data to controller 430. Likewise, a user operating wearable device 405 enters control system data into wearable device 405 in order to write back the control system data to industrial controller 430 via gateway 420. For example, the user may set new tag values for controller 430 using wearable device 405. Accordingly, wearable device 405 transfers the control system data to gateway 420 which in turn transfers the control system data to industrial controller 430 in order to write the control system data back to controller 430 to set the new tag values.

Beneficially, by enabling remote configuration of gateway 420 from within mobile application 403, gateway 420 may be configured to communicate with industrial controller 430 for mobile application 403 and wearable device 405. Once configured by applying the configuration data received from mobile application 403, gateway 420 may operate to enable mobile application 403 and wearable device 405 to receive device data from industrial controller 430, and to write back control system data to controller 430 via gateway 420. Additionally, gateway 420 may be embedded into mobile application 403 as a common gateway platform by leveraging the computational capabilities of mobile device 401 to provide some or all of the functionality of gateway 420 described herein. Some example graphical user interface displays provided by an automation mobile application that may be used to configure a gateway for a wearable device will now be discussed with respect to FIGS. 7-10.

Figure 7:
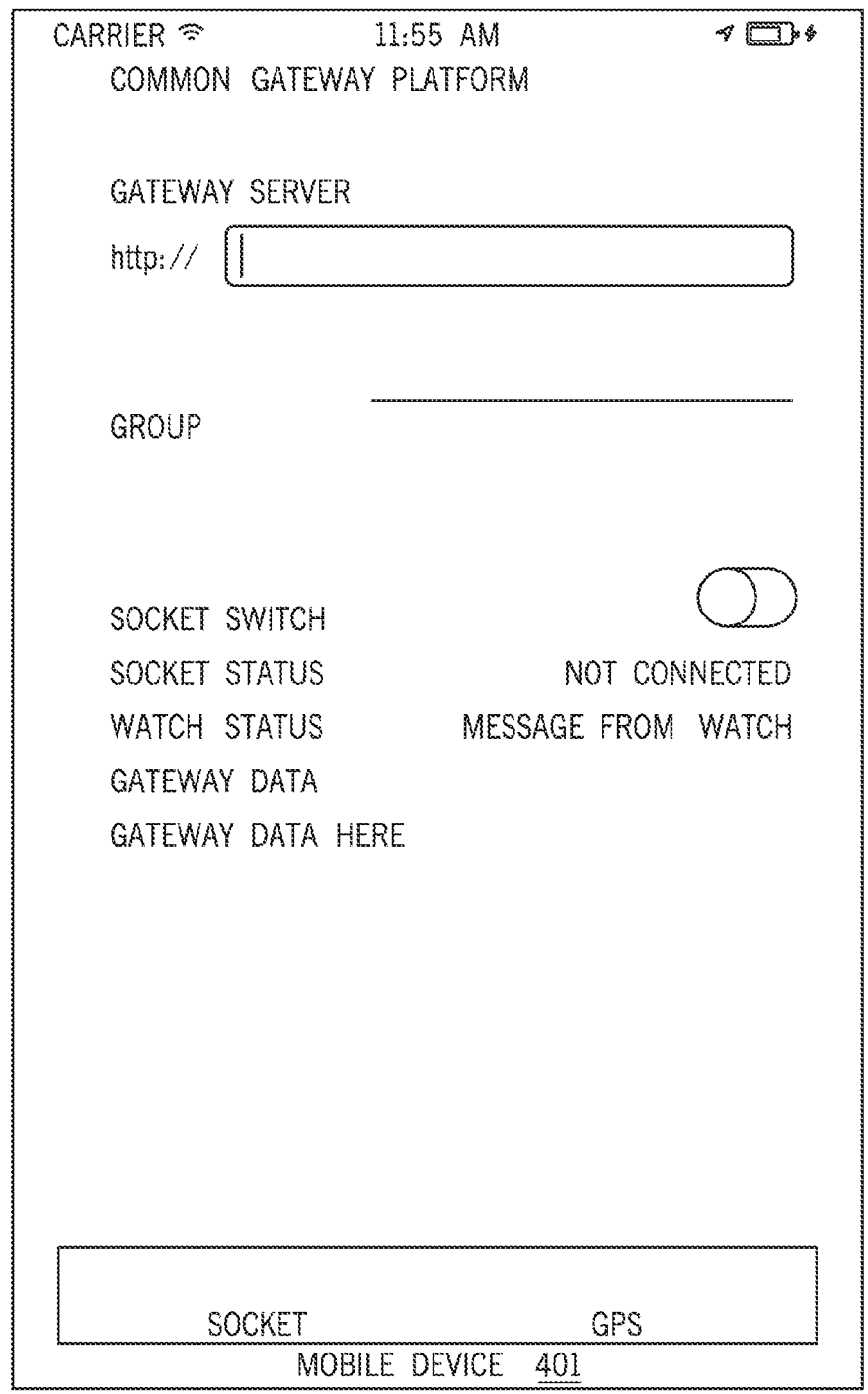
FIG. 7 is a block diagram that illustrates an operational scenario of a mobile application displayed on a mobile device in an exemplary implementation.

FIG. 7 is a block diagram that illustrates a display screen of a mobile application executing on mobile device 401 in an exemplary implementation. The mobile application comprises an automation mobile application for use on a mobile device such as a smartphone, tablet, or laptop. In this example, the mobile application provides a graphical user interface display that may be used to configure a gateway for a wearable device, such as a smart watch. By interacting with the display, the user can specify a common gateway platform for an industrial controller and/or device by entering a network location of a gateway server associated with a gateway, such as gateway 420. The network address of the gateway server could be associated with a separate, stand-alone gateway server system, or could be a network address associated with a mobile device executing a mobile application to function as a gateway server, including a network address associated with mobile device 401 itself.

In addition to specifying the gateway server, the user may also enter a group into the graphical display provided by the mobile application executing on mobile device 401, in order to specify a particular team or group of which the user may be a member. The graphical display also provides a mechanism for the user to enable or disable a socket switch, and displays the connection status of the socket. The graphical display for the mobile application also provides a watch status area that displays messages from a smart watch configured for the gateway, and an area to display gateway data. In this example, the user has not yet entered a gateway server network address or specified a particular group, the socket switch is off, and the socket status is not connected. Another operational scenario of a mobile application displayed on mobile device 401 will now be described with respect to FIG. 8.

Figure 8:
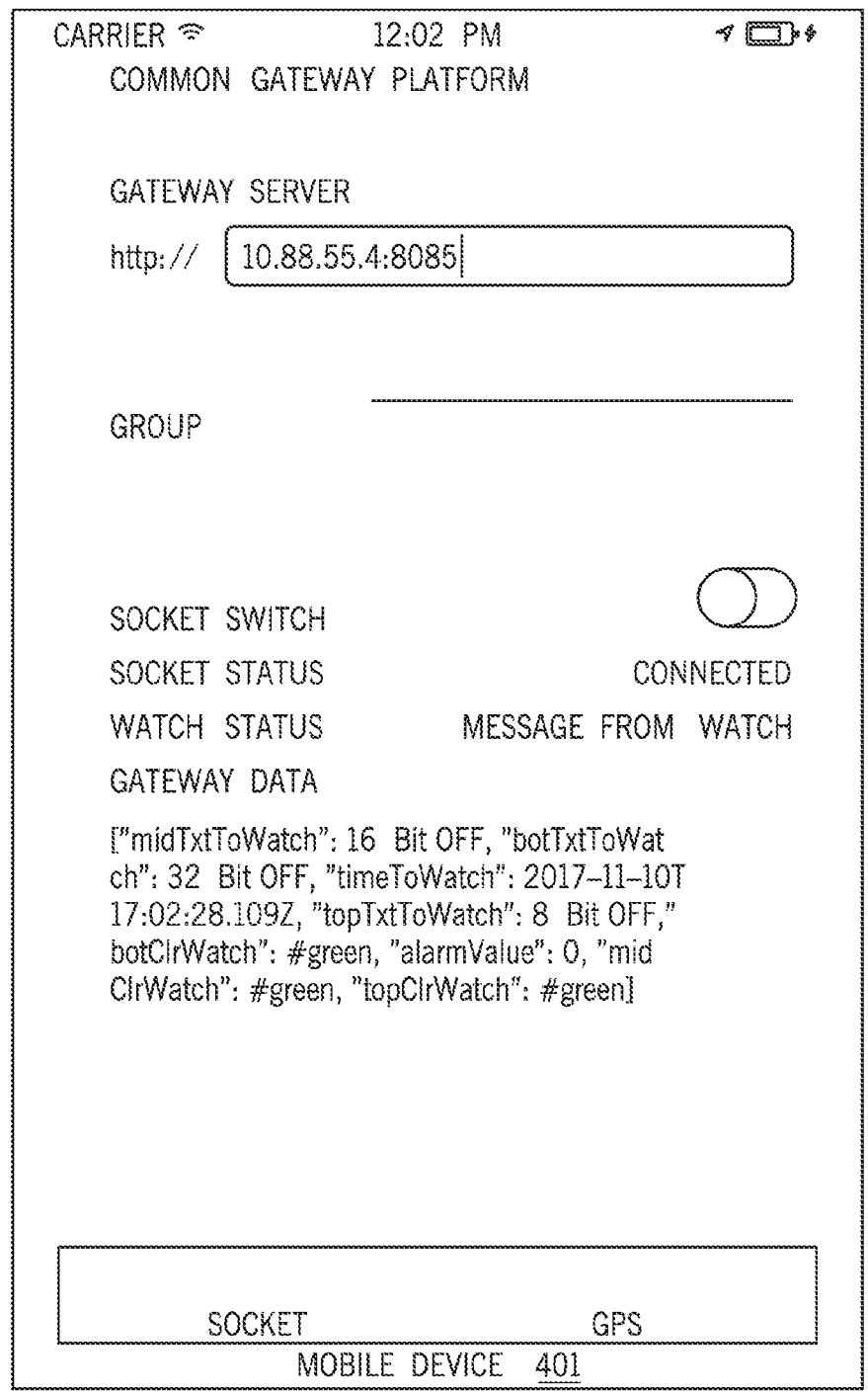
FIG. 8 is a block diagram that illustrates an operational scenario of a mobile application displayed on a mobile device in an exemplary implementation.

FIG. 8 is a block diagram that illustrates a display screen of a mobile application executing on mobile device 401 in an exemplary implementation. In this example, the mobile application provides a graphical user interface display that may be used to configure a gateway for a wearable device, such as a smart watch. As shown in FIG. 8, the user has specified a common gateway platform for an industrial controller and/or device by entering a network location of "http://10.88.55.4:8085" to specify a gateway server associated with a gateway. In addition to specifying the gateway server, the user has enabled the socket switch, and the socket status displays the connection status of the socket as "Connected". The graphical display for the mobile application also provides a watch status area that displays messages from a smart watch configured for the gateway, and an area that displays gateway data. In this example, the gateway data provides an example of a colon-delimited text string comprising industrial data and display instructions encoded into the text string for delivery to mobile device 401 and/or wearable device 405 as a realtime notification message via a common gateway platform. Another operational scenario of a mobile application displayed on mobile device 401 in an exemplary implementation will now be described with respect to FIG. 9.

Figure 9:
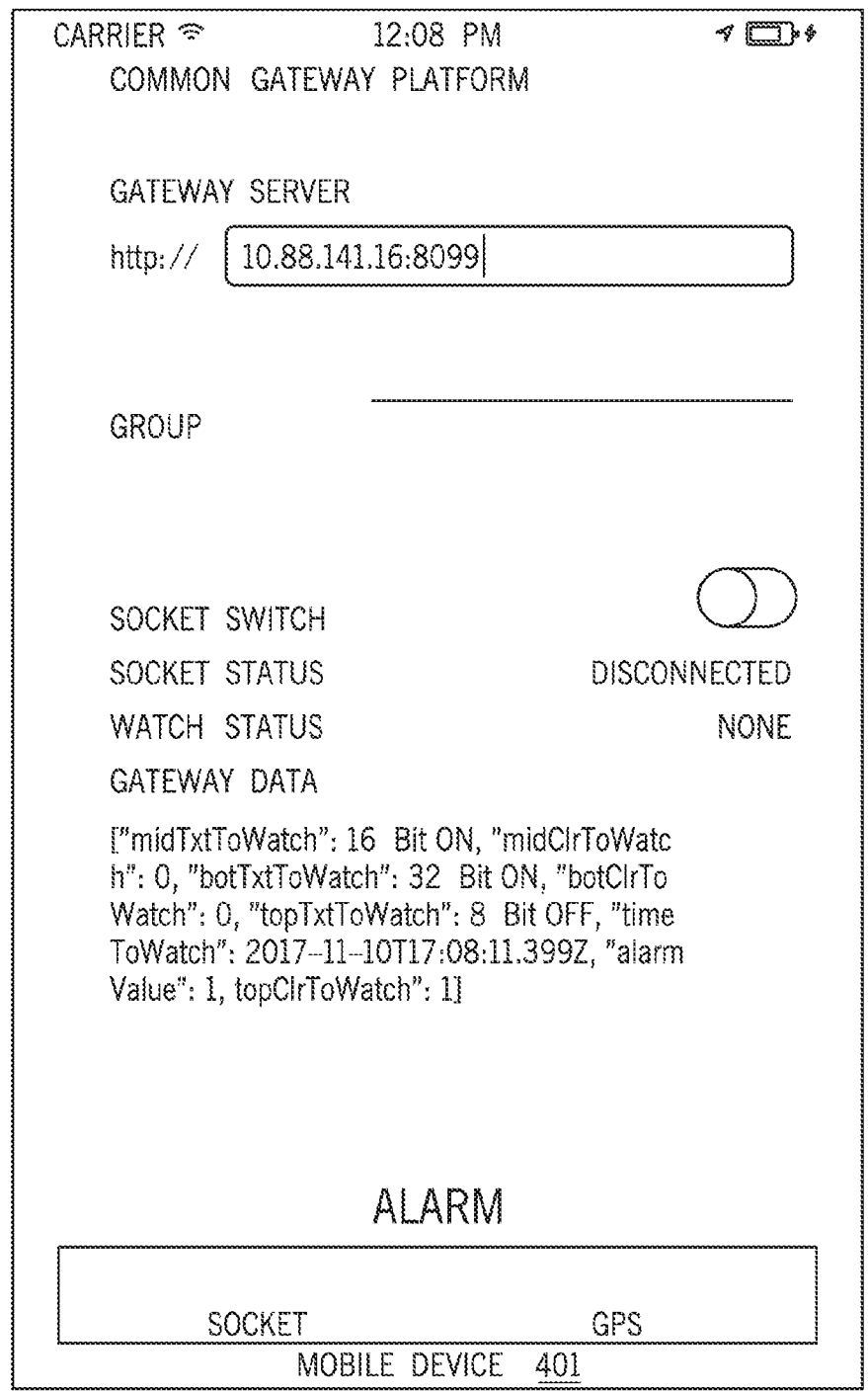
FIG. 9 is a block diagram that illustrates an operational scenario of a mobile application displayed on a mobile device in an exemplary implementation.

FIG. 9 is a block diagram that illustrates a display screen of a mobile application executing on mobile device 401 in an exemplary implementation. In this example, the mobile application provides a graphical user interface display that may be used to configure a gateway for a wearable device, such as a smart watch. As shown in FIG. 9, the user has specified a common gateway platform for an industrial controller and/or device by entering a network location of "http://10.88.141.16:8099" to specify a gateway server associated with a gateway. In addition to specifying the gateway server, the user has disabled the socket switch, and the socket status displays the connection status of the socket as "Disconnected". The graphical display for the mobile application also provides a watch status area that displays messages from a smart watch configured for the gateway, and an area that displays gateway data. In this example, the gateway data provides an example of a colon-delimited text string comprising industrial data and display instructions encoded into the text string for delivery to mobile device 401 and/or wearable device 405 as a realtime notification message via a common gateway platform. At the bottom of the graphical display of the mobile application, an alarm status area indicates that an alarm has been triggered. Another operational scenario of a mobile application displayed on mobile device 401 in an exemplary implementation will now be described with respect to FIG. 10.

Figure 10:
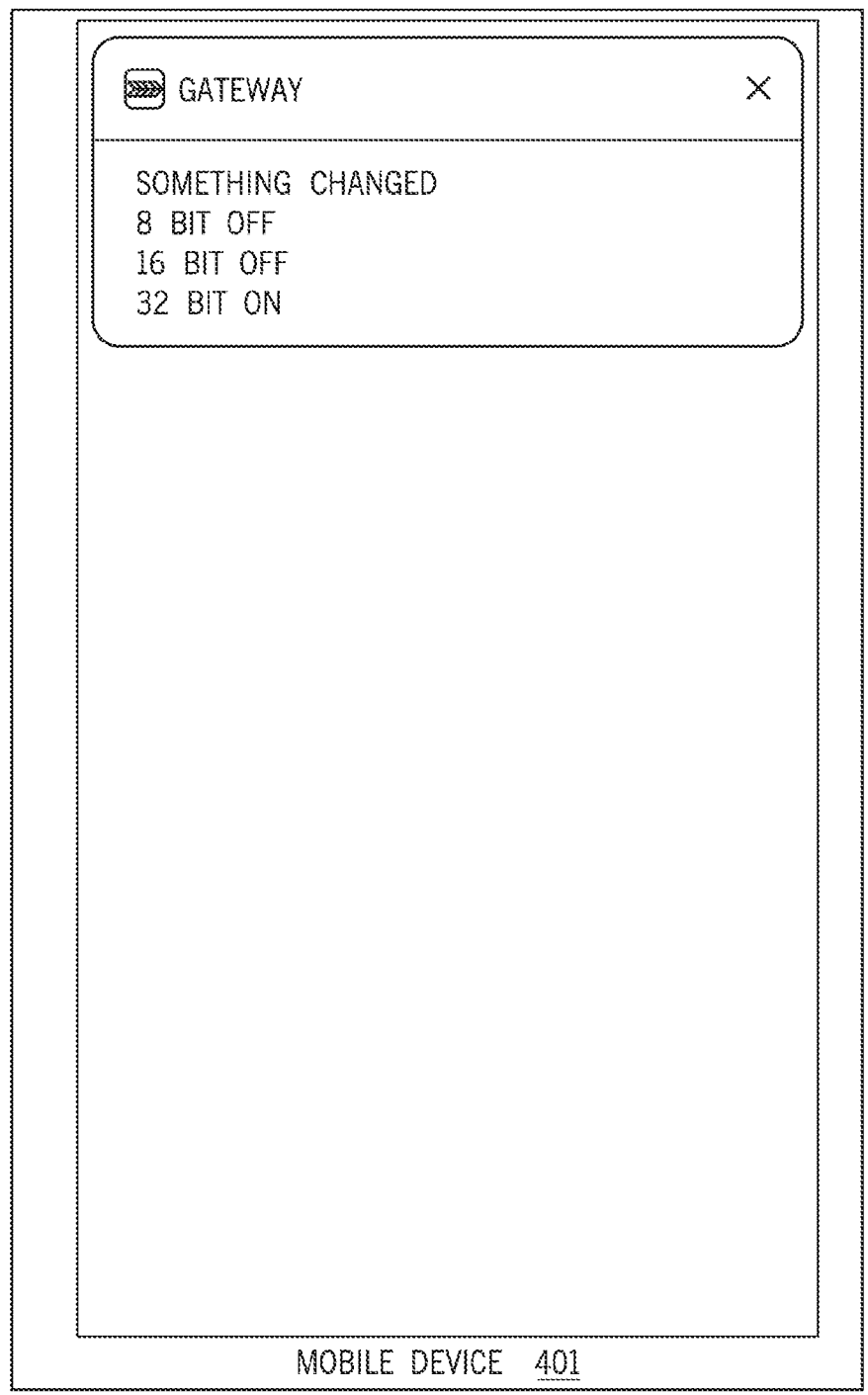
FIG. 10 is a block diagram that illustrates an operational scenario of a mobile application displayed on a mobile device in an exemplary implementation.

FIG. 10 is a block diagram that illustrates a display screen of a mobile application executing on mobile device 401 in an exemplary implementation. The mobile application comprises an automation mobile application for use on a mobile device such as a smartphone, tablet, or laptop. In this example, the display of the mobile application provides a gateway status window. As shown in FIG. 10, the gateway status window in this example indicates "Something Changed" and displays channel status information of "8 Bit OFF", "16 Bit OFF", and "32 Bit ON". Accordingly, the gateway status window enables a user to monitor the status of a gateway configured using the mobile application, as shown and described above with respect to FIGS. 7-9. Some example graphical user interface displays provided by an application executing on a wearable device will now be discussed with respect to FIGS. 11-13.

FIG. 11 is a block diagram that illustrates a display screen of an application executing on wearable device 405 in an exemplary implementation. In this example, the display of the wearable device application provides a settings menu for the wearable device application. The settings menu enables a user to enable or disable a socket connection to the gateway configured for the wearable device. The settings menu for the wearable device application also provides configurable settings for the Common Gateway Platform (CGP) and Line Data. Another operational scenario of an application displayed on wearable device 405 in an exemplary implementation will now be described with respect to FIG. 12.

FIG. 12 is a block diagram that illustrates a display screen of an application executing on wearable device 405 in an exemplary implementation. In this example, the display of the wearable device application provides a status screen for input and output (I/O) channels associated with an industrial controller accessible by wearable device 405 via a gateway configured to wearable device 405. In this example, the I/O channel status display screen indicates channel status information of "8 Bit OFF", "16 Bit OFF", and "32 Bit OFF". The status screen of wearable device 405 also indicates the current time. Another operational scenario of an application displayed on wearable device 405 in an exemplary implementation will now be described with respect to FIG. 13.

FIG. 13 is a block diagram that illustrates a display screen of an application executing on wearable device 405 in an exemplary implementation. In this example, the display of the wearable device application provides a status screen I/O channels associated with an industrial controller accessible by wearable device 405 via a gateway configured to wearable device 405. In this example, the I/O channel status display screen indicates channel status information of "8 Bit OFF", "16 Bit ON", and "32 Bit ON". The status screen of wearable device 405 also indicates the current time. Advantageously, by configuring a gateway for wearable device 405 to interact with an industrial controller and/or industrial device, the user of wearable device 405 is provided with real-time display of data and the ability to effect control system data for the industrial controller using wearable device 405.

Now referring back to FIG. 1, computing device 101 comprises a processing system and communication transceiver. Computing device 101 may also include other components such as a user interface, data storage system, and power supply. Computing device 101 may reside in a single device or may be distributed across multiple devices. Examples of computing device 101 include mobile computing devices, such as cell phones, tablet computers, laptop computers, notebook computers, gaming devices, smartwatches, wearable media players, wearable gaming devices, as well as any other type of mobile computing device and any combination or variation thereof. Examples of computing device 101 may also include desktop computers, server computers, and virtual machines, as well as any other type of computing system, variation, or combination thereof. In some implementations, computing device 101 could comprise a mobile device capable of operating in a server-like fashion which, among other uses, could be utilized in a wireless mesh network.

Factory network 110 could comprise multiple network elements such as routers, gateways, telecommunication switches, servers, processing systems, or other communication equipment and systems for providing communication and data services. In some examples, factory network 110 could comprise wireless communication nodes, telephony switches, Internet routers, network gateways, computer systems, communication links, or some other type of communication equipment, including combinations thereof. Factory network 110 may also comprise optical networks, packet networks, wireless mesh networks (WMN), local area networks (LAN), metropolitan area networks (MAN), wide area networks (WAN), or other network topologies, equipment, or systems, including combinations thereof. Factory network 110 may be configured to communicate over metallic, wireless, or optical links. Factory network 110 may be configured to use time-division multiplexing (TDM), Internet Protocol (IP), Ethernet, optical networking, wireless protocols, communication signaling, peer-to-peer networking over Bluetooth, Bluetooth low energy, Wi-Fi Direct, near field communication (NFC), or some other communication format, including combinations thereof. In some examples, factory network 110 includes further access nodes and associated equipment for providing communication services to several computer systems across a large geographic region.

Common gateway platform 120 comprises a processing system and a communication transceiver. Common gateway platform 120 may also include other components such as a router, server, data storage system, and power supply. Common gateway platform 120 may reside in a single device or may be distributed across multiple devices. Common gateway platform 120 may be a discrete system or may be integrated within other systems, including other systems within communication system 100.

Industrial controller 130 comprises a processing system and a communication transceiver. Industrial controller 130 may reside in a single device or may be distributed across multiple devices. Industrial controller 130 may be a discrete system or may be integrated within other systems, including other systems within communication system 100. Industrial controller 130 could comprise various industrial control systems, which could include automation controllers, programmable logic controllers (PLCs), programmable automation controllers (PACs), or any other controllers used in automation control.

Industrial device 131 could comprise any device or asset used in industrial automation. For example, industrial device 131 could comprise a machine, sensor, drive, pump, filter, drill, motor, robot, fabrication machinery, mill, printer, or any other industrial automation equipment. Additionally, industrial device 131 could comprise other industrial equipment, such as a brew kettle in a brewery, a reserve of coal or other resources, or any other element that may reside in an industrial automation environment.

Turning now to FIG. 14, a block diagram that illustrates an industrial automation environment 1400 in an exemplary implementation is shown. Industrial automation environment 1400 provides an example of an industrial automation environment that may be utilized to implement the device configuration processes disclosed herein, but other environments could also be used. Industrial automation environment 1400 includes computing system 1410, machine system 1420, industrial controller 1425, and gateway 1430. Computing system 1410 provides an example of mobile device 101, although device 101 could use alternative configurations. Gateway 1430 provides an example of gateway 120, although gateway 120 could use alternative configurations. Machine system 1420 and controller 1425 are in communication over a communication link, controller 1425 and gateway 1430 communicate over a communication link, and gateway 1430 and computing system 1410 are in communication over a communication link. Note that there would typically be many more machine systems in most industrial automation environments, but the number of machine systems shown in FIG. 14 has been restricted for clarity.

Industrial automation environment 1400 comprises an automobile manufacturing factory, food processing plant, oil drilling operation, microprocessor fabrication facility, or some other type of industrial enterprise. Machine system 1420 could comprise a sensor, drive, pump, filter, drill, motor, robot, fabrication machinery, mill, printer, or any other industrial automation equipment, including their associated control systems. A control system comprises, for example, industrial controller 1425, which could include automation controllers, programmable logic controllers (PLCs), programmable automation controllers (PACs), or any other controllers used in automation control. Additionally, machine system 1420 could comprise other industrial equipment, such as a brew kettle in a brewery, a reserve of coal or other resources, or any other element that may reside in an industrial automation environment 1400.

Machine system 1420 continually produces operational data over time. The operational data indicates the current status of machine system 1420, such as parameters, pressure, temperature, speed, energy usage, operational equipment effectiveness (OEE), mean time between failure (MTBF), mean time to repair (MTTR), voltage, throughput volumes, times, tank levels, or any other performance status metrics. The operational data may comprise dynamic charts or trends, real-time video, or some other graphical content. Machine system 1420 and/or controller 1425 are capable of transferring the operational data over a communication link to gateway 1430 and/or computing system 1410, typically via a communication network.

Gateway 1430 comprises a processing system and a communication transceiver. Gateway 1430 may also include other components such as a router, server, data storage system, and power supply. Gateway 1430 may reside in a single device or may be distributed across multiple devices. Gateway 1430 may be a discrete system or may be integrated within other systems, including other systems within industrial automation environment 1400.

The communication links over which data is exchanged between machine system 1420, industrial controller 1425, gateway 1430, and communication interface 1408 of computing system 1410 could use metal, air, space, optical fiber such as glass or plastic, or some other material as the transport medium, including combinations thereof. The communication links could comprise multiple network elements such as routers, gateways, telecommunication switches, servers, processing systems, or other communication equipment and systems for providing communication and data services. These communication links could use various communication protocols, such as IP, Ethernet, optical networking, packet networks, wireless mesh networks (WMN), local area networks (LAN), metropolitan area networks (MAN), wide area networks (WAN), hybrid fiber coax (HFC), communication signaling, wireless protocols, communication signaling, peer-to-peer networking over Bluetooth, Bluetooth low energy, Wi-Fi Direct, near field communication (NFC), or some other communication format, including combinations thereof. The communication links could be direct links or may include intermediate networks, systems, or devices.

Computing system 1410 may be representative of any computing apparatus, system, or systems on which the device configuration processes disclosed herein or variations thereof may be suitably implemented. Computing system 1410 provides an example of a computing system that could be used as a either a server or a client device in some implementations, although such devices could have alternative configurations. Examples of computing system 1410 include mobile computing devices, such as cell phones, tablet computers, laptop computers, notebook computers, and gaming devices, as well as any other type of mobile computing devices and any combination or variation thereof. Examples of computing system 1410 also include desktop computers, server computers, and virtual machines, as well as any other type of computing system, variation, or combination thereof. In some implementations, computing system 1410 could comprise a mobile device capable of operating in a server-like fashion which, among other uses, could be utilized in a wireless mesh network.

Computing system 1410 includes processing system 1401, storage system 1403, software 1405, communication interface 1408, and user interface 1409. Processing system 1401 is operatively coupled with storage system 1403, communication interface 1408, and user interface 1409. Processing system 1401 loads and executes software 1405 from storage system 1403. Software 1405 includes application 1406 and operating system 1407. Application 1406 may include industrial display process 200 in some examples, as indicated by the dashed line in FIG. 14. When executed by computing system 1410 in general, and processing system 1401 in particular, software 1405 directs computing system 1410 to operate as described herein for industrial display process 200 or variations thereof. In this example, user interface 1409 includes display system 1411, which itself may be part of a touch screen that also accepts user inputs via touches on its surface. Computing system 1410 may optionally include additional devices, features, or functionality not discussed here for purposes of brevity.

Referring now to FIG. 15, a block diagram that illustrates computing system 1500 in an exemplary implementation is shown. Computing system 1500 provides an example of mobile device 101, wearable device 105, gateway 120, or any computing system that may be used to execute industrial display process 200 or variations thereof, although such systems could use alternative configurations. Computing system 1500 includes processing system 1501, storage system 1503, software 1505, communication interface 1507, and user interface 1509. User interface 1509 comprises display system 1508. Software 1505 includes application 1506 which itself includes industrial display process 200. Industrial display process 200 may optionally be implemented separately from application 1506, as indicated by the dashed lines surrounding process 200 in FIG. 15.

Computing system 1500 may be representative of any computing apparatus, system, or systems on which application 1506 and industrial display process 200 or variations thereof may be suitably implemented. Examples of computing system 1500 include mobile computing devices, such as cell phones, tablet computers, laptop computers, notebook computers, and gaming devices, as well as any other type of mobile computing devices and any combination or variation thereof. Note that the features and functionality of computing system 1500 may apply as well to desktop computers, server computers, and virtual machines, as well as any other type of computing system, variation, or combination thereof.

Computing system 1500 includes processing system 1501, storage system 1503, software 1505, communication interface 1507, and user interface 1509. Processing system 1501 is operatively coupled with storage system 1503, communication interface 1507, and user interface 1509. Processing system 1501 loads and executes software 1505 from storage system 1503. When executed by computing system 1500 in general, and processing system 1501 in particular, software 1505 directs computing system 1500 to operate as described herein for industrial display process 200 or variations thereof. Computing system 1500 may optionally include additional devices, features, or functionality not discussed herein for purposes of brevity.

Referring still to FIG. 15, processing system 1501 may comprise a microprocessor and other circuitry that retrieves and executes software 1505 from storage system 1503. Processing system 1501 may be implemented within a single processing device but may also be distributed across multiple processing devices or sub-systems that cooperate in executing program instructions. Examples of processing system 1501 include general purpose central processing units, application specific processors, and logic devices, as well as any other type of processing device, combinations, or variations thereof.

Storage system 1503 may comprise any computer-readable storage media capable of storing software 1505 and readable by processing system 1501. Storage system 1503 may include volatile and nonvolatile, removable and non-removable media implemented in any method or technology for storage of information, such as computer readable instructions, data structures, program modules, or other data. Storage system 1503 may be implemented as a single storage device but may also be implemented across multiple storage devices or sub-systems co-located or distributed relative to each other. Storage system 1503 may comprise additional elements, such as a controller, capable of communicating with processing system 1501. Examples of storage media include random-access memory, read-only memory, magnetic disks, optical disks, flash memory, virtual memory and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In no case is the computer-readable storage media a propagated signal.

In operation, in conjunction with user interface 1509, processing system 1501 loads and executes portions of software 1505, such as industrial display process 200, to render a graphical user interface for application 1506 for display by display system 1508 of user interface 1509. Software 1505 may be implemented in program instructions and among other functions may, when executed by computing system 1500 in general or processing system 1501 in particular, direct computing system 1500 or processing system 1501 to establish a realtime communication connection through a common gateway platform to an industrial controller. Software 1505 may further direct computing system 1500 or processing system 1501 to receive a realtime notification message comprising industrial data and display instructions encoded into a text string generated by the industrial controller, the display instructions comprising display properties for the industrial data that specify how to display the industrial data on computing system 1500. Finally, software 1505 may direct computing system 1500 or processing system 1501 to process the text string to generate and render a display of the industrial data for display on computing system 1500 according to the display properties provided in the display instructions.

Software 1505 may include additional processes, programs, or components, such as operating system software or other application software. Examples of operating systems include Windows®, iOS®, and Android®, as well as any other suitable operating system. Software 1505 may also comprise firmware or some other form of machine-readable processing instructions executable by processing system 1501.

In general, software 1505 may, when loaded into processing system 1501 and executed, transform computing system 1500 overall from a general-purpose computing system into a special-purpose computing system customized to facilitate interactions with industrial devices in an industrial automation environment as described herein for each implementation. For example, encoding software 1505 on storage system 1503 may transform the physical structure of storage system 1503. The specific transformation of the physical structure may depend on various factors in different implementations of this description. Examples of such factors may include, but are not limited to the technology used to implement the storage media of storage system 1503 and whether the computer-storage media are characterized as primary or secondary storage.

In some examples, if the computer-storage media are implemented as semiconductor-based memory, software 1505 may transform the physical state of the semiconductor memory when the program is encoded therein. For example, software 1505 may transform the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate this discussion.

It should be understood that computing system 1500 is generally intended to represent a computing system with which software 1505 is deployed and executed in order to implement application 1506 and/or industrial display process 200 (and variations thereof). However, computing system 1500 may also represent any computing system on which software 1505 may be staged and from where software 1505 may be distributed, transported, downloaded, or otherwise provided to yet another computing system for deployment and execution, or yet additional distribution. For example, computing system 1500 could be configured to deploy software 1505 over the internet to one or more client computing systems for execution thereon, such as in a cloud-based deployment scenario.

Communication interface 1507 may include communication connections and devices that allow for communication between computing system 1500 and other computing systems (not shown) or services, over a communication network 1511 or collection of networks. In some implementations, communication interface 1507 receives dynamic data 1521 over communication network 1511. Examples of connections and devices that together allow for inter-system communication may include network interface cards, antennas, power amplifiers, RF circuitry, transceivers, and other communication circuitry. The aforementioned network, connections, and devices are well known and need not be discussed at length here.

User interface 1509 may include a voice input device, a touch input device for receiving a gesture from a user, a motion input device for detecting non-touch gestures and other motions by a user, and other comparable input devices and associated processing elements capable of receiving user input from a user. Output devices such as display system 1508, speakers, haptic devices, and other types of output devices may also be included in user interface 1509. The aforementioned user input devices are well known in the art and need not be discussed at length here. User interface 1509 may also include associated user interface software executable by processing system 1501 in support of the various user input and output devices discussed above. Separately or in conjunction with each other and other hardware and software elements, the user interface software and devices may provide a graphical user interface, a natural user interface, or any other kind of user interface. User interface 1509 may be omitted in some implementations.

The functional block diagrams, operational sequences, and flow diagrams provided in the Figures are representative of exemplary architectures, environments, and methodologies for performing novel aspects of the disclosure. While, for purposes of simplicity of explanation, methods included herein may be in the form of a functional diagram, operational sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The above description and associated drawings teach the best mode of the invention. The following claims specify the scope of the invention. Some aspects of the best mode may not fall within the scope of the invention as specified by the claims. Also, while the preceding discussion describes embodiments employed specifically in conjunction with the monitoring and analysis of industrial processes, other applications, such as the mathematical modeling or monitoring of any man-made or naturally-existing system, may benefit from use of the concepts discussed above. Further, those skilled in the art will appreciate that the features described above can be combined in various ways to form multiple variations of the invention. As a result, the invention is not limited to the specific embodiments described above, but only by the following claims and their equivalents.

What is claimed is:

1. A mobile computing device to facilitate interactions with industrial devices in an industrial automation environment, the mobile computing device comprising:
   a memory; and
   a processor, operatively coupled to the memory, that executes an industrial mobile application comprising program instructions stored on the memory that, when executed by the processor, direct the processor to at least:
   configure a common gateway platform between the mobile computing device and an industrial controller to establish a realtime communication connection through the common gateway platform to the industrial controller;
   receive a realtime notification message comprising industrial data and display instructions encoded into a text string generated and transmitted by the industrial controller via the realtime communication connection through the common gateway platform, the display instructions comprising display properties for the industrial data that specify how to display the industrial data on the mobile computing device; and
   process the text string to generate and render a display of the industrial data for display on the mobile computing device according to the display properties provided in the display instructions.

2. The mobile computing device of claim 1 wherein the realtime communication connection through the common gateway platform to the industrial controller comprises a socket.IO connection.

3. The mobile computing device of claim 1 wherein the mobile computing device comprises a smartwatch.

4. The mobile computing device of claim 1 wherein the mobile computing device comprises a smartphone.

5. The mobile computing device of claim 1 wherein the industrial data comprises device status information associated with a machine operated by the industrial controller.

6. The mobile computing device of claim 1 wherein the mobile computing device is configured to write control system data back to the industrial controller via the common gateway platform.

7. The mobile computing device of claim 1 wherein the realtime notification message comprises an alarm notification generated and transmitted by the industrial controller.

8. A non-transitory computer-readable medium having stored thereon instructions that, in response to execution, cause a mobile computing device comprising a processor to perform operations, the operations comprising:
   configuring a common gateway platform between the mobile computing device and an industrial controller to establish a realtime communication connection through the common gateway platform to the industrial controller;
   receiving a realtime notification message comprising industrial data and display instructions encoded into a text string generated and transmitted by the industrial controller via the realtime communication connection through the common gateway platform, the display instructions comprising display properties for the industrial data that specify how to display the industrial data on the mobile computing device; and
   processing the text string to generate and render a display of the industrial data for display on the mobile computing device according to the display properties provided in the display instructions.

9. The non-transitory computer-readable medium of claim 8 wherein the realtime communication connection through the common gateway platform to the industrial controller comprises a socket.IO connection.

10. The non-transitory computer-readable medium of claim 8 wherein the mobile computing device comprises a smartwatch.

11. The non-transitory computer-readable medium of claim 8 wherein the mobile computing device comprises a smartphone.

12. The non-transitory computer-readable medium of claim 8 wherein the industrial data comprises device status information associated with a machine operated by the industrial controller.

13. The non-transitory computer-readable medium of claim 8 wherein the mobile computing device is configured to write control system data back to the industrial controller via the common gateway platform.

14. The non-transitory computer-readable medium of claim 8 wherein the realtime notification message comprises an alarm notification generated and transmitted by the industrial controller.

15. A method of operating a mobile computing device comprising an industrial mobile application to facilitate interactions with industrial devices in an industrial automation environment, the method comprising:
   configuring, by a mobile computing device comprising a processor, a common gateway platform between the mobile computing device and an industrial controller to establish a realtime communication connection through a common gateway platform to an industrial controller;
   receiving, by the mobile computing device, a realtime notification message comprising industrial data and display instructions encoded into a text string generated and transmitted by the industrial controller via the realtime communication connection through the common gateway platform, the display instructions comprising display properties for the industrial data that specify how to display the industrial data on the mobile computing device; and
   processing, by the mobile computing device, the text string to generate and render a display of the industrial data for display on the mobile computing device according to the display properties provided in the display instructions.

16. The method of claim 15 wherein the realtime communication connection through the common gateway platform to the industrial controller comprises a socket.IO connection.

17. The method of claim 15 wherein the mobile computing device comprises a smartwatch.

18. The method of claim 15 wherein the mobile computing device comprises a smartphone.

19. The method of claim 15 wherein the industrial data comprises device status information associated with a machine operated by the industrial controller.

20. The method of claim 15 wherein the mobile computing device is configured to write control system data back to the industrial controller via the common gateway platform.

* * * * *